E. H. GOVE.
SIPHON FLUSHING APPARATUS.
APPLICATION FILED FEB. 23, 1912.

1,072,711.

Patented Sept. 9, 1913.

WITNESSES
Mary C. Page
Charles L. Foster

INVENTOR
Edward H. Gove
by Clifford venilt Clifford
attorneys

UNITED STATES PATENT OFFICE.

EDWARD H. GOVE, OF BIDDEFORD, MAINE.

SIPHON FLUSHING APPARATUS.

1,072,711.  Specification of Letters Patent.  Patented Sept. 9, 1913.

Application filed February 23, 1912. Serial No. 679,261.

*To all whom it may concern:*

Be it known that I, EDWARD H. GOVE, a citizen of the United States, residing at Biddeford, in the county of York and State of Maine, have invented a certain new and useful Improvement in Siphon Flushing Apparatus, of which the following is a specification.

This invention relates to the construction of siphon flushing apparatus. Its object is to provide a siphon adapted to operate easily and with absolute certainty.

Figure 1:
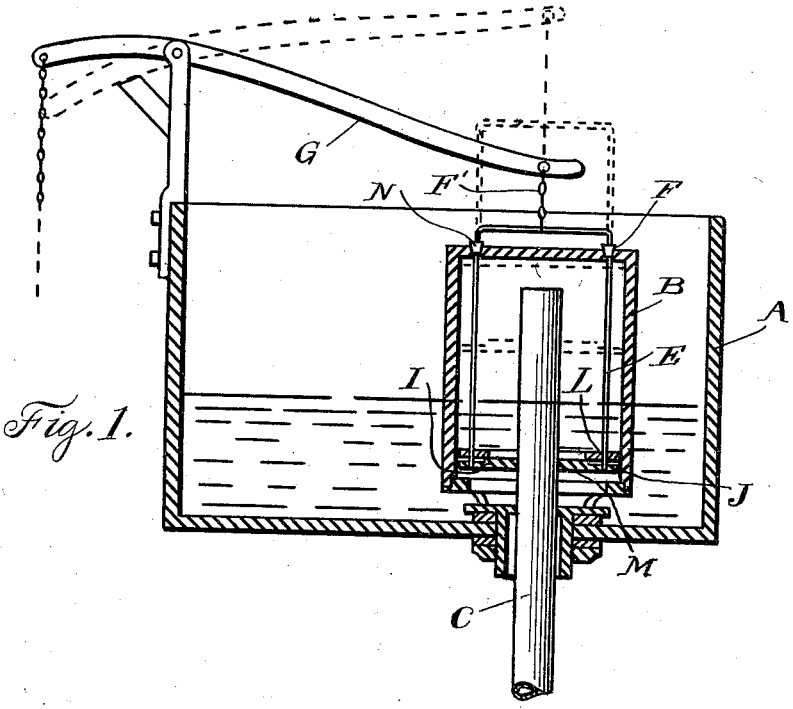
Figure 2:
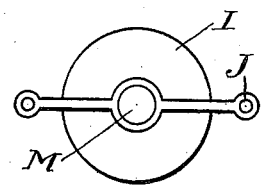

In the drawings herewith accompanying and making a part of this application Figure 1 is a vertical sectional view of one embodiment of my invention; and Fig. 2 is a bottom plan view of the lower disk of the plunger shown in Fig. 1.

Same reference characters indicate like parts in the several figures.

In said drawings A is a tank. Mounted in the tank is a siphon comprising a short leg B open at the bottom and closed at the top and a long leg C opening out of the short leg. The long leg may terminate within the short leg, as illustrated in Fig. 1. Mounted in the short leg of the siphon is a plunger supported upon and operated by plunger rods E which pass up through openings F in the top of the short leg. The plunger rods are connected to the operating lever G by means of a flexible link F.

In the embodiment of my invention illustrated in Fig. 1 the plunger is composed of two disks. The lower, I, rigidly secured to the plunger rods, is of less diameter than the diameter of the short leg and is provided with laterally extended lugs J to which the plunger rods are attached. The upper disk is freely movable upon the plunger rods, the rods passing through holes L in the disk. The upper disk closes the space between the edge of the lower disk I and the wall of the short leg, when the two disks are in contact, and is provided with a central opening M about equal in size to the lower disk, so that, when the two disks which form the plunger are in contact, they completely fill the space between the two legs.

The plunger rods in the embodiment of my invention shown in Fig. 1 are provided on the outside with packings N adapted to close the openings in the top of the short leg through which the plunger rods pass and these openings may be cone-shaped and the packings cone-shaped to correspond adapting them to make a tighter joint. In this case, it is to be noted that, when the plunger rods and plunger are raised and the siphon is in action, the upwardly flowing water carries and holds the upper disk above the intake of the long leg while the lower disk, as soon as the lever is released, immediately returns down, the packings on the plunger rods closing the openings and preventing the passage of air into the short leg and consequent breaking of siphon action.

The advantages of my improved flushing apparatus are: That it is exceedingly simple in structure; it operates with absolute certainty on account of the plunger rising above the intake of the long leg and on account of the complete closing during siphon action of the openings through which the plunger rods pass.

Having thus described my invention and its use, I claim:

In a siphon flushing apparatus, a tank, a siphon comprising a short leg and a long leg, a plunger mounted in the short leg comprising two disks, one above the other, the two disks, when in contact, substantially closing the short leg, said disks being provided with non registering openings, the two disks being mounted upon plunger rods, the lower disk rigidly secured thereto and the upper disk freely slidable thereon, and means for raising the lower disk to a point spaced apart below the intake of the long leg, the upper disk being free to rise above said intake.

EDWARD H. GOVE.

Witnesses:
 ELGIN C. VERRILL,
 CHARLES L. FOSTER.

---

Copies of this patent may be obtained for five cents each, by addressing the "Commissioner of Patents, Washington, D. C."